US006647828B2

(12) United States Patent
Hakim

(10) Patent No.: US 6,647,828 B2
(45) Date of Patent: Nov. 18, 2003

(54) HARD/SOFT SPOON PRODUCTS

(76) Inventor: Nouri E. Hakim, 3030 Aurora Ave., 2nd Floor, Monroe, LA (US) 71201

( * ) Notice: Subject to any disclaimer, the term of this patent is extended or adjusted under 35 U.S.C. 154(b) by 0 days.

(21) Appl. No.: 10/252,754

(22) Filed: Sep. 23, 2002

(65) Prior Publication Data

US 2003/0070303 A1 Apr. 17, 2003

Related U.S. Application Data

(62) Division of application No. 09/353,904, filed on Jul. 15, 1999, now Pat. No. 6,453,562.

(60) Provisional application No. 60/097,571, filed on Aug. 24, 1998.

(51) Int. Cl.[7] .................................................. A47J 43/28

(52) U.S. Cl. ................................ 76/105; 30/326; 30/324

(58) Field of Search .......................... 30/324, 326, 322, 30/327, 340, 325; D7/653; 76/105, 104.1; 264/271.1, 279, 274

(56) References Cited

U.S. PATENT DOCUMENTS

| | | | | | |
|---|---|---|---|---|---|
| 558,503 | A | * | 4/1896 | Marbury | 30/328 |
| D143,450 | S | * | 1/1946 | Storm | D7/653 |
| 2,752,678 | A | * | 7/1956 | Welch | 30/324 |
| 2,796,992 | A | * | 6/1957 | Perrin | 210/471 |
| 2,873,027 | A | * | 2/1959 | Dohner | 210/222 |
| 3,254,409 | A | * | 6/1966 | Gardel et al. | 30/324 |
| 3,358,619 | A | * | 12/1967 | Pareira | 425/276 |
| 3,473,221 | A | * | 10/1969 | Flanders | 30/141 |
| 4,005,310 | A | * | 1/1977 | Baisch | 219/227 |
| 4,106,197 | A | * | 8/1978 | Russell | 30/324 |
| 5,264,267 | A | * | 11/1993 | Wang | 428/76 |
| 5,376,325 | A | * | 12/1994 | Ormson | 264/254 |
| 5,669,143 | A | * | 9/1997 | Wu | 30/324 |
| 5,920,993 | A | * | 7/1999 | Wenk | 30/324 |
| 6,115,923 | A | * | 9/2000 | Gentry et al. | 30/324 |
| 6,134,790 | A | * | 10/2000 | Watson | 30/326 |

FOREIGN PATENT DOCUMENTS

| | | |
|---|---|---|
| FR | 7509208 | * 11/1975 |

* cited by examiner

*Primary Examiner*—Kenneth E. Peterson
*Assistant Examiner*—Omar Flores Sánchez
(74) *Attorney, Agent, or Firm*—Morris E. Cohen

(57) ABSTRACT

A process for making a combination food utensil constructed of materials having different relative hardness, particularly a spoon. A skeleton or backbone of the utensil is constructed of a hard material such as polypropylene to provide structural rigidity and to allow the utensil to easily slide along the bottom of a dish such as bowl or a plate. Outside edges of the utensil and portions of its handle are constructed of a softer material such as Kraton or silicon to provide for comfortable contact with the inside of the mouth and gums. In the preferred embodiment the spoon is provided for use by a baby.

45 Claims, 3 Drawing Sheets

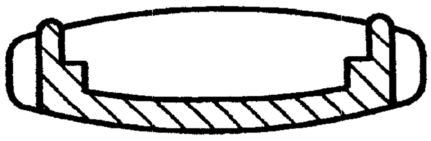
FIG. 6(B)
SECTION B
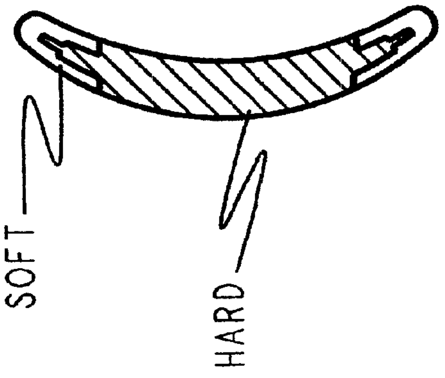
FIG. 6(A)
SECTION A
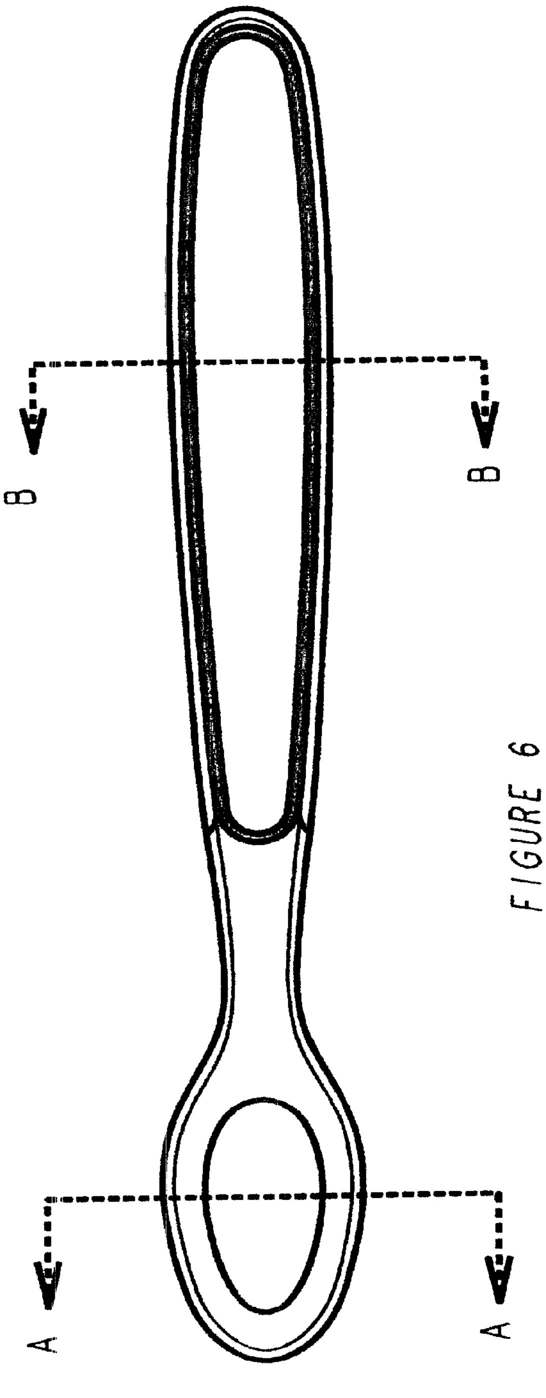
FIG. 6(C)
FIGURE 6

HARD/SOFT SPOON PRODUCTS

RELATED APPLICATIONS

The present application is a divisional of U.S. Nonprovisional application Ser. No. 09/353,904 filed Jul. 15, 1999, now U.S. Pat. No. 6,453,562. which claims the priority of U.S. Provisional application Ser. No. 60/097,571 filed Aug. 24, 1998. The priority of both applications is claimed, both of which are fully incorporated herein by reference.

FIELD OF THE INVENTION

The present invention is directed to an improved utensil made of a composite of materials of different hardness. In one embodiment, the present invention relates to a spoon which is made of a hard material forming a skeleton of the spoon and located at the center of its bowl; and a soft material located along the circumference of the spoon's bowl. In addition, the present invention relates to a method of manufacture of the combination-material utensil.

BACKGROUND OF THE INVENTION

Currently, soft baby spoons are commonly used in the art. However, the soft spoons can be difficult to use in some circumstances. Structural parts constructed of soft material usually have higher coefficient of friction and therefore can not slide easily across a dish such as a plate or bowl and, as a result, can occasionally be somewhat uncomfortable to use. In addition, due to the softness of the material used in the spoon, the spoon can often bend unnecessarily. Therefore, there is a substantial use in the art for a new utensil which would combine the comfort of the soft-material utensil with the structural integrity and slideability of the utensil made of a hard material.

SUMMARY OF THE INVENTION

In accordance with the invention, a utensil is provided which is constructed out of a combination of a plurality of materials of different hardness. Preferably, the utensil includes a soft material component which makes the utensil more comfortable in use and a hard component which improves the overall structural integrity of the spoon.

Other objects, advantages and features of this invention will be more apparent in conjunction with the disclosure herein.

BRIEF DESCRIPTION OF THE FIGURES

A full understanding of the invention can be gained from the following description of the preferred embodiment when read in conjunction with the accompanying drawings in which:

FIG. 6 is a series of views of the apparatus of the present invention, FIGS. 6(A) and 6(B) being cross sectional views taken along lines A—A and B—B, respectively, of FIG. 6(C), and FIG. 6(C) being a top view.

DETAILED DESCRIPTION OF THE INVENTION AND THE PREFERRED EMBODIMENTS

The present invention is directed to an improved utensil constructed of a combination of different materials having different relative hardness. In the preferred embodiment, the invention is directed to a spoon for babies or children which is constructed of a combination of hard and soft materials.

Accordingly, pursuant to the present invention, a composite or combination-material utensil is provided having at least two materials of different hardness incorporated therein. In the preferred embodiment, the invention is a baby spoon. The spoon preferably includes a soft material component and a hard material component. In the preferred embodiment, the spoon includes Kraton as the soft material component. The soft material component is a comfortable material which is preferably used on portions of the spoon which are in close contact with the baby's gums, mouth and skin.

The spoon also preferably includes a hard material component. In the preferred embodiment, the spoon includes polypropylene as the hard material component. The hard material component preferably provides the backbone of the spoon and preferably provides structural rigidity. The hard material can also be incorporated into other specific portions of the spoon, including, for example, the underside of the spoon's bowl (i.e. the food contacting or food containing member). In one such embodiment, the hard material can make it relatively easy to slide the spoon across a bowl or other dish. This facilitates scooping food into the bowl of the spoon and portion control. In addition, use of the the hard material as the backbone prevents the undesirable bending of the spoon which is often found in soft spoons of the prior art. Accordingly, incorporation of the harder material into the spoon can add structural rigidity to the handle and/or to the bowl.

Further description of the invention is apparent with reference to the figures. As shown therein, spoon 7 is a composite of two separate materials, a first, harder, material and a second, softer, material. In the preferred embodiment, the harder material is polypropylene, although in accordance with the invention, other materials such as other plastics or metals can be used, as well. Also in accordance with the invention, the softer material is Kraton, although silicone or other elastomers or flexible materials can also be used consistent with the invention.

Figure 1:
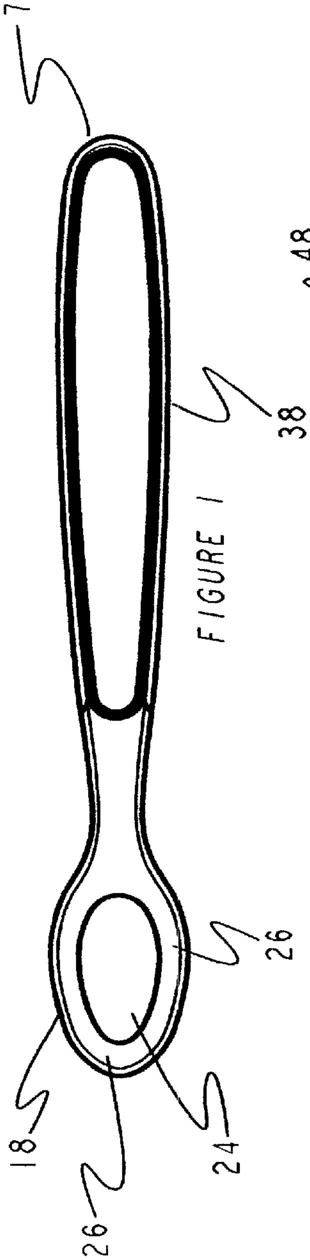
FIG. 1 is a top view of the combination-material utensil in accordance with the present invention, showing the top outer surface of the utensil.
Figure 2:
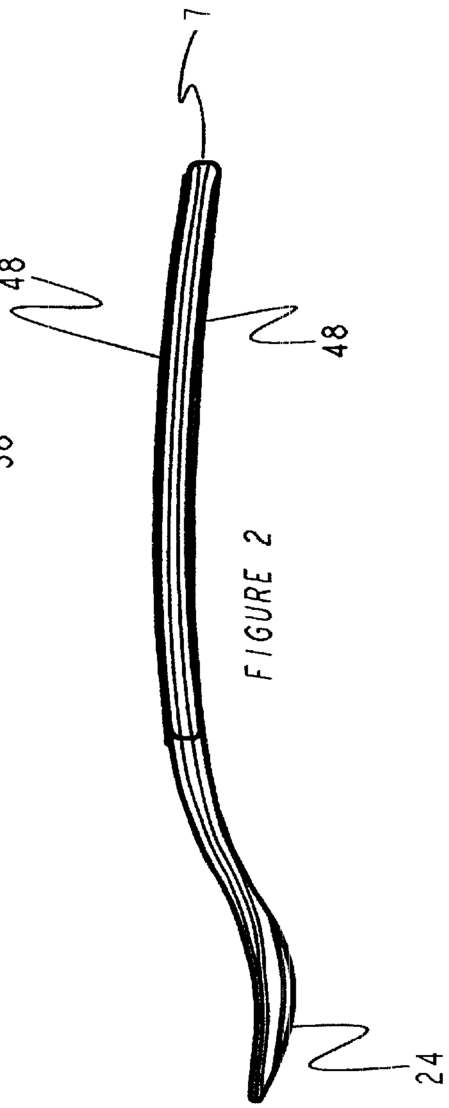
FIG. 2 is a side view of the utensil of FIG. 1.
Figure 3:
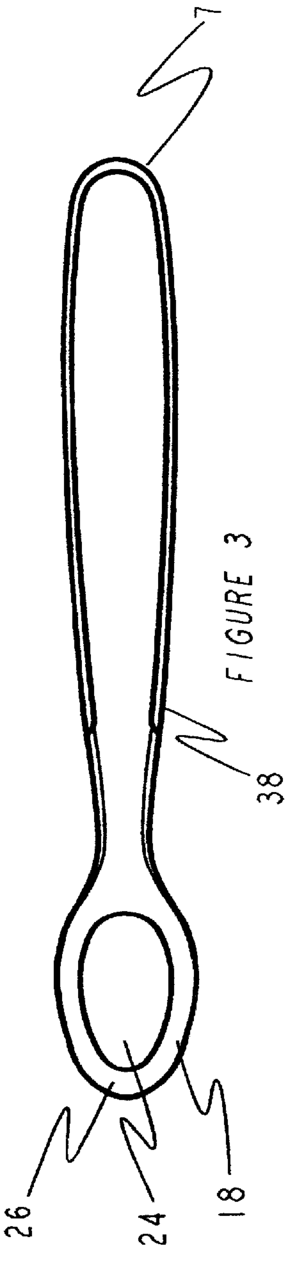
FIG. 3 is a bottom view of the utensil of FIG. 1, showing the bottom outer surface of the utensil.
Figure 5:
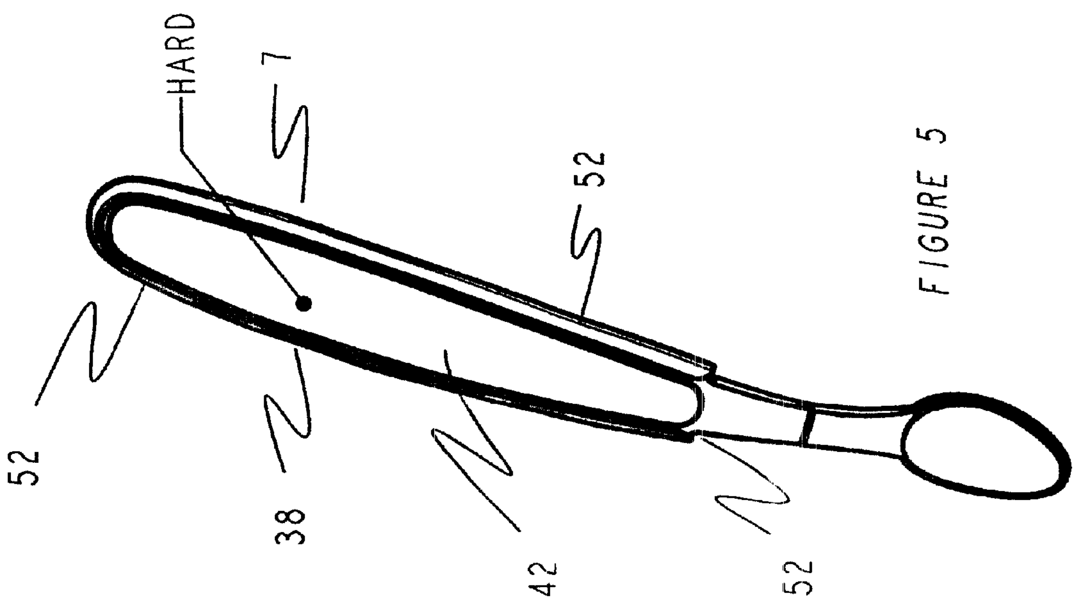
FIG. 5 is a perspective view of the utensil in accordance with the present invention, before application of the soft component thereto.
Figure 4:
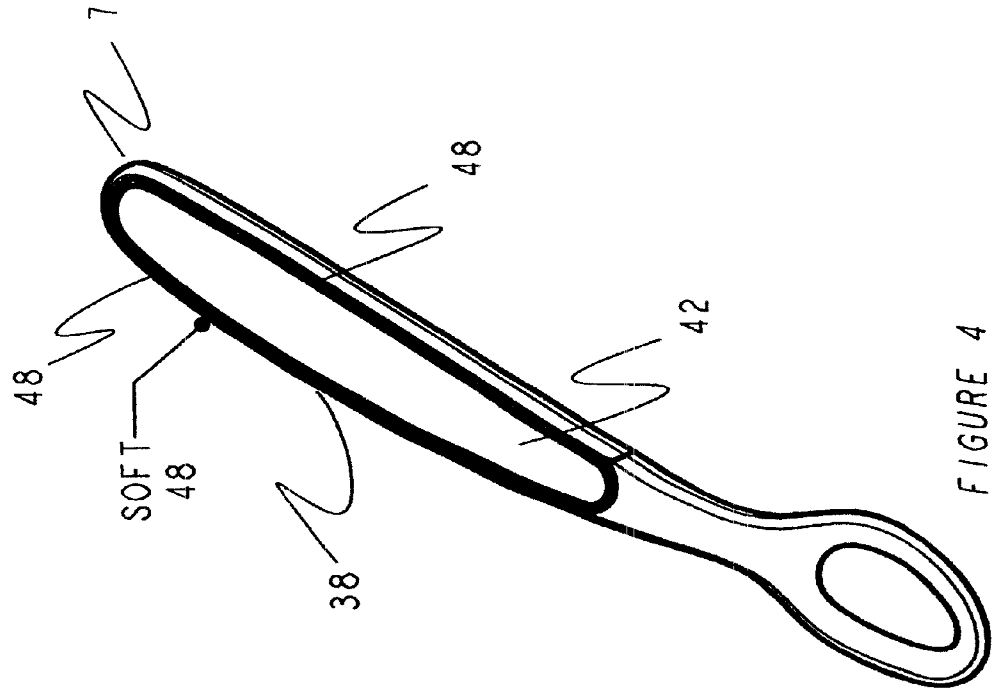
FIG. 4 is a perspective view of the combination-material utensil in accordance with the present invention.

FIG. 1 is a top view and FIG. 3 is a bottom view of the preferred embodiment of the spoon or utensil of the present invention. In accordance with the invention, spoon 7 includes a bowl or dish 18 having a center 24, which is composed of a hard material such as polypropylene or so forth, as discussed above. The construction of the bowl from this hard material allows the spoon to be easily slid across a dish such as a bowl or a plate and prevents undue bending of the spoon during use. In a preferred embodiment, as shown in FIG. 1, the bowl of the spoon does not have holes extending through it, thus, it can hold liquid therein.

Bowl or dish 18 further includes a circumferential section 26. The circumferential section 26 is preferably constructed from a relative soft material such as Kraton or silicone. The soft material is molded around the center 24 of the bowl 18 to protect the child's teeth and gums, and provides greater comfort to the baby's mouth than a spoon entirely constructed out of the hard material. Thus, as shown in the figures, in one preferred embodiment, in the bowl or dish section 18 the hard component of the spoon protrudes through and is surrounded by the soft component of the spoon.

Consistent with the invention, the hard component of the spoon preferably forms the backbone, or skeleton and infrastructure of the entire spoon, as shown in FIGS. 1, 3, 4 and 5. This hard material provides the entire spoon with a rigid structural component and prevents the spoon from bending during use.

Thus, handle 38 of spoon 7 includes an upper inner section 42 made of the hard material described above. Handle 38 is preferably provided for gripping comfort with the soft material covering the bottom of the spoon. The hard material forms the edges of the spoon. Handle 38 further includes ribs 48 made of a soft material. Ribs 48 are preferably located on the inside edge of handle 38 and are applied to grooves 52 of the spoon, shown in FIG. 5. The ribs extend through the entire handle to protrude through its top and bottom surfaces and provide for easy gripping.

FIG. 6 further shows the spoon of the present invention in cross-sectional views. FIG. 6(A) is a cross-sectional view of the bowl or dish portion 18 and FIG. 6(B) is a cross-sectional view of the handle 28 of the spoon of the present invention, both showing the preferred juxtaposition of the hard and soft materials of the present invention.

In a preferred embodiment of the invention, the utensil or spoon is constructed using insert molding. In the preferred embodiment, the hard polypropylene component of the spoon is molded first to form the skeleton or backbone of the spoon. Following molding of the hard component, this backbone is taken out either mechanically or by hand. The hard component backbone is then placed into a mold where the Kraton, or relatively softer component, is injected onto and through the hard plastic to form the finished spoon.

Although a preferred embodiment of the combination spoon has been disclosed herein in accordance with the invention, other embodiments can be constructed as well. Thus, any desired modifications can be made to the bowl or to the handle of the spoon consistent with the invention, including modification of the relative positions of the hard and soft components and/or the number of different sections and types of hard and soft components and/or the specific identities of the hard and soft components utilized. Likewise, other composite hard/soft utensils can be constructed consistent with the invention, such as knives or forks. Or, other manufacturing processes can be used, if desired, to construct the products disclosed herein.

Having described this invention with regard to specific embodiments, it is to be understood that the description is not meant as a limitation since further variations or modifications may be apparent or may suggest themselves to those skilled in the art. It is intended that the present application cover such variations and modifications as fall within the scope of the appended claims.

What is claimed is:

1. A manufacturing process, comprising the steps of:

forming a spoon from at least two materials, a first material and a second material;

wherein said spoon has a bowl, and said bowl has a circumference;

said spoon being formed such that the surface of said bowl of said spoon is formed in part from said first material and in part from said second material, with said second material placed at said circumference of said bowl; and, wherein said second material is softer than said first material.

2. A process as claimed in claim 1, wherein said spoon is a spoon for a baby.

3. A process as claimed in claim 2, wherein said spoon is provided with said second material to provide comfort to a baby's mouth.

4. A process as claimed in claim 2, wherein said spoon is provided with said second material at said circumference to provide comfort to a baby's gums.

5. A process as claimed in claim 1, wherein said first material and said second material are placed next to each other on said surface of said bowl.

6. A process as claimed in claim 1, wherein said spoon further comprises a handle, said handle being formed in part from said first material, and in part from said second material.

7. A process as claimed in claim 1, wherein said first material is polypropylene.

8. A process as claimed in claim 1, wherein said second material is Kraton.

9. A process as claimed in claim 1, wherein said first material is polypropylene and said second material is an elastomer.

10. A process as claimed in claim 1, wherein said second material is an elastomer.

11. A process as claimed in claim 1, wherein said second material is flexible.

12. A process as claimed in claim 1, wherein said surface is the top of said bowl of said spoon.

13. A process as claimed in claim 1, wherein said surface is the bottom of said bowl of said spoon.

14. A process as claimed in claim 1, wherein said spoon does not have holes extending through said bowl.

15. A process as claimed in claim 1, wherein said spoon can hold liquid within said bowl.

16. A process as claimed in claim 1, wherein said bowl has a center, and wherein said bowl comprises said first material on said surface at said center of said bowl.

17. A process as claimed in claim 1, wherein one of said two materials extends through the other of said two materials.

18. A process as claimed in claim 6, wherein one of said two materials extends in said handle through the other of said two materials.

19. A process as claimed in claim 1, wherein said first material is a material which provides rigidity to said spoon.

20. A process as claimed in claim 1, wherein said first material is a material which slides easily across a dish.

21. A process as claimed in claim 1, wherein said second material is a material which does not slide easily across a dish.

22. A process as claimed in claim 1, wherein said second material is a material which provides comfort against a baby's mouth.

23. A process as claimed in claim 1, wherein said first material is a material which provides rigidity to said spoon, and said second material is a material which provides comfort against a baby's mouth.

24. A manufacturing process, comprising the steps of:

molding a first material to form a skeleton of a spoon; and injecting a second material through said skeleton to form a combination-material spoon, said combination-material spoon comprising a bowl, said bowl comprising a circumference;

such that said bowl comprises both said first material and said second material on the surface of said bowl, said second material being placed at said circumference of said bowl; and, wherein said second material is softer than said first material.

25. A process as claimed in claim 24, further comprising the step of:

taking said skeleton out of a first mold and placing it into a second mold prior to injecting said second material.

26. A process as claimed in claim 24, wherein said spoon is a spoon for a baby.

27. A process as claimed in claim 26, wherein said spoon is provided with said second material to provide comfort to a baby's mouth.

28. A process as claimed in claim 26, wherein said spoon is provided with said second material at said circumference to provide comfort to a baby's gums.

29. A process as claimed in claim 24, wherein said first material and said second material are placed next to each other on said surface of said bowl.

30. A process as claimed in claim 24, wherein said spoon further comprises a handle, said handle being formed in part from said first material, and in part from said second material.

31. A process as claimed in claim 24, wherein said first material is polypropylene.

32. A process as claimed in claim 24, wherein said second material is Kraton.

33. A process as claimed in claim 24, wherein said first material is polypropylene and said second material is an elastomer.

34. A process as claimed in claim 24, wherein said second material is an elastomer.

35. A process as claimed in claim 24, wherein said second material is flexible.

36. A process as claimed in claim 24, wherein said surface is the top of said bowl of said spoon.

37. A process as claimed in claim 24, wherein said surface is the bottom of said bowl of said spoon.

38. A process as claimed in claim 24, wherein said spoon does not have holes extending through said bowl.

39. A process as claimed in claim 24, wherein said spoon can hold liquid within said bowl.

40. A process as claimed in claim 24, wherein said bowl has a center, and wherein said bowl comprises said first material on said surface at said center of said bowl.

41. A process as claimed in claim 24, wherein said first material is a material which provides rigidity to said spoon.

42. A process as claimed in claim 24, wherein said first material is a material which slides easily across a dish.

43. A process as claimed in claim 24, wherein said second material is a material which does not slide easily across a dish.

44. A process as claimed in claim 24, wherein said second material is a material which provides comfort against a baby's mouth.

45. A process as claimed in claim 24, wherein said first material is a material which provides rigidity to said spoon, and said second material is a material which provides comfort against a baby's mouth.

* * * * *